United States Patent

[11] 3,603,968

| [72] | Inventor | Allen L. Johnson |
| | | Meriden, Conn. |
| [21] | Appl. No. | 645,430 |
| [22] | Filed | June 12, 1967 |
| [45] | Patented | Sept. 7, 1971 |
| [73] | Assignee | Ripley Company, Inc. |
| | | Middletown, Conn. |

[54] MONITORING SYSTEM
5 Claims, 7 Drawing Figs.

[52] U.S. Cl. .................................................. 340/336, 340/166
[51] Int. Cl. .................................................. G09f 9/32
[50] Field of Search .......................................... 340/336, 336 X, 324, 334, 335, 336, 337, 166

[56] References Cited
UNITED STATES PATENTS
2,146,576  2/1939  Haselton et al. ............... 340/336

| 3,106,696 | 10/1963 | Foley | 340/336 |
| 3,147,469 | 9/1964 | Buchsbaum | 340/336 |
| 3,161,867 | 12/1964 | Isborn | 340/336 |
| 3,204,234 | 8/1965 | Nakauchi | 340/336 |
| 3,400,388 | 9/1968 | Blank | 340/336 |

Primary Examiner—John W. Caldwell
Assistant Examiner—Marshall M. Curtis
Attorney—Delio and Montgomery ABSTRACT: A system for displaying information from a plurality of metering registers, comprising a plurality of indicators, each of said indicators having a plurality of illumination means which, when actuated in a predetermined order, present symbols, gating means, and control means for providing signals to scan each of said registers in a predetermined order and then to control said gating means to provide signals representative of signals from said registers in the same said predetermined order, to provide signals to actuate said illumination means.

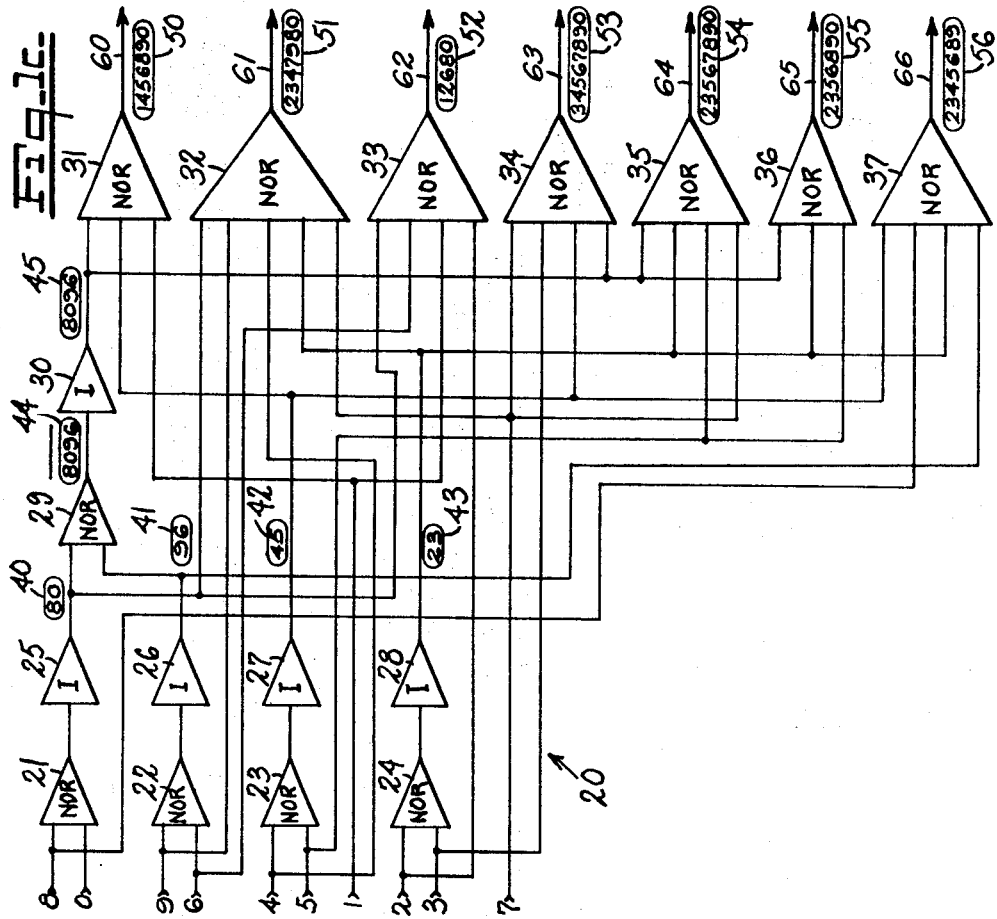
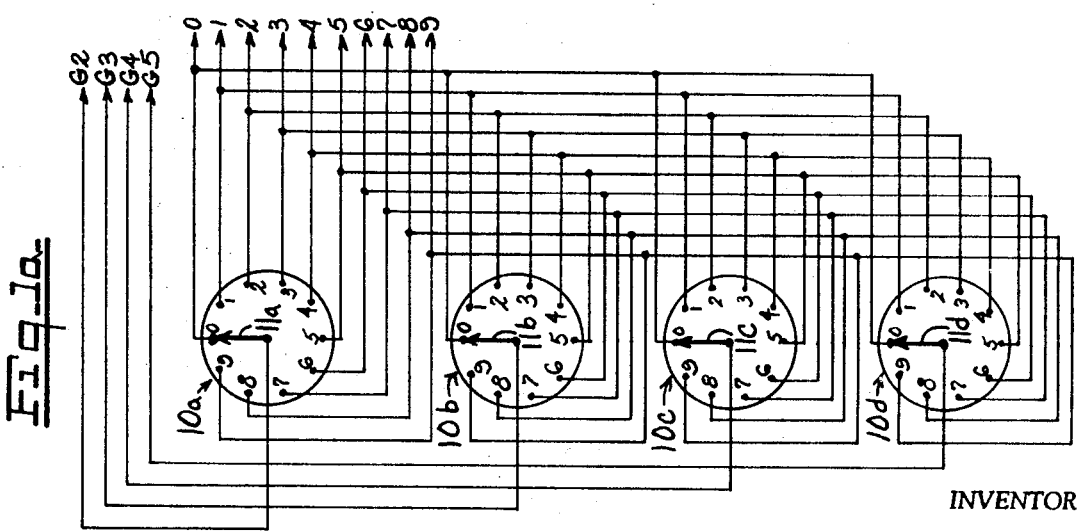

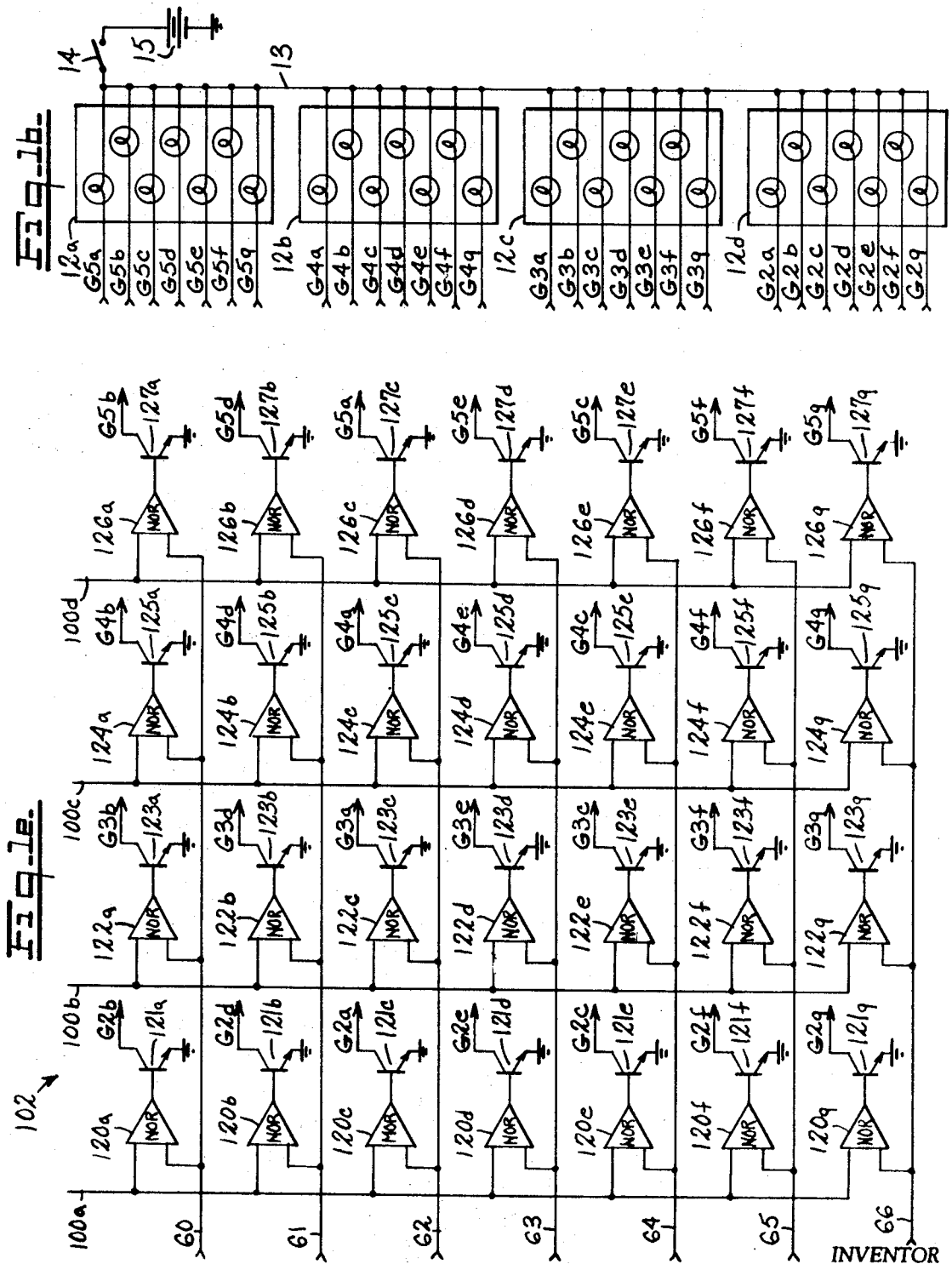

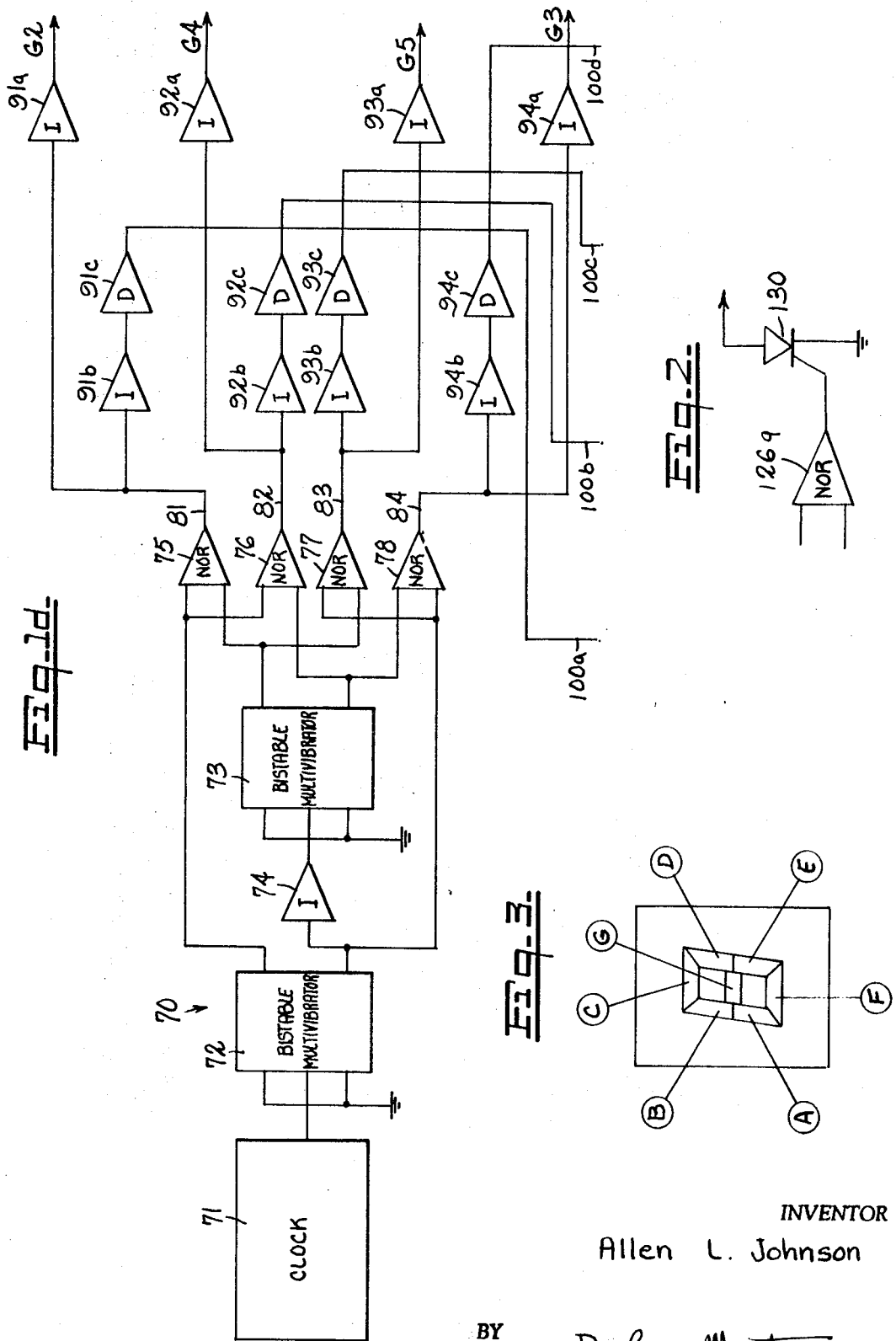

MONITORING SYSTEM

This invention relates to a system for reading out information stored in a meter such as the usual type of commercial or residential watt-hour meter, water meter, gas meter or the like. More particularly, this invention relates to a system for sequentially sensing information stored within a plurality of meter registers, converting such information to a predetermined format suitable for presentation by a display device.

The purpose of this invention is to provide a small, lightweight meter readout system which may be carried by the meter reader on his normal rounds of commercial or residential installations using public or private sources of energy, water, or the like. The system of this invention is intended for use with metering devices such as shown in U.S. Pat. Nos. 3,195,814 and 3,006,712, and in conjunction with multiple electrical connectors as disclosed in U.S. Pat. No. 3,222,471.

It has been proposed that utility systems automate to a considerable degree the information which must be collected periodically in order to bill the consumers. As mentioned in the above patents, it has been suggested that the currently utilized gas, electric and water meters be adapted to include auxiliary metering mechanisms which may be coupled directly to the present day meters.

In essence, the auxiliary metering mechanism could be a rotary switch arrangement having a wiper arm and a plurality of contacts 0–9 positioned about the circumference of a circle. The contacts 0–9 would correspond to the usual 0–9 numerals on an ordinary meter. A cable would be provided, extending from the meter installation to a point easily accessible to the meter reader who could then insert a probe such as that shown in the above-mentioned patent 3,222,471, in order to readout the information provided by the auxiliary metering mechanism. Although various devices have been suggested for use in conjunction with reading out the auxiliary meter, they have heretofore been cumbersome and complicated, as well as too heavy to be conveniently utilized by the meter reader.

In view of the foregoing, this invention provides a simple, economical, illuminated display which may be read out-of-doors and which is capable of displaying the readings of a plurality of meter registers, such that the information may be recorded by the meter reader. The operation of the system of this invention is simple and, therefore, may easily be used by a nontechnical person by the mere insertion of a probe as shown in the above-mentioned patent. The data stored in each of the registers of the normal metering mechanism may then be easily observed and recorded without further effort on the part of the meter reader.

Accordingly, it is an object of this invention to provide a new and improved system for reading the data in a plurality of meter registers.

Another object of this invention is to provide a new and improved display system for displaying information stored on meter registers using common data lines.

A further object of this invention is to provide a new and improved technique for sampling data stored in meter registers and sequencing the display of such stored information.

Still other objects and advantages of the invention will in part be obvious and will in part appear from the specification.

The invention accordingly comprises the features of construction, combination of elements and arrangements of parts which will be exemplified in the constructions hereinafter set forth, and the scope of the invention will be indicated in the claims.

For a fuller understanding of the invention, reference is had to the following description taken in conjunction with the accompanying drawings, in which:

FIG. 1a is a diagrammatic representation of an auxiliary metering mechanism;

FIGS. 1b–1e are schematic diagrams of a system according to this invention;

FIG. 2 is a schematic diagram of a portion of the driving circuits of the invention utilizing silicon-controlled rectifiers instead of transistors; and FIG. 3 is a diagram of the display according to the invention.

Referring to FIGS. 1a–1e, there is show a scanning and display system of the invention. In particular, FIG. 1a shows a plurality of registers 10a–10d. These registers are capable of presenting units, tens, hundreds and thousands, generally recorded by a normal watt-hour water or gas meter. The registers are shown in schematic form and represent the rotary switch having a plurality of contacts 11a–11d, respectively. The rotary switch could be utilized in conjunction with the metering mechanism, of the type shown in the above-mentioned patent 3,195,814, wherein the wiper arms 11a–11d could be driven simultaneously with the movement of the pointer shown in that patent.

It should also be understood that the rotary switch 10a–10d could be put directly on the commonly-utilized, present-day watt-hour water or gas meter, if desired, or could replace them in totality if a direct visual readout is not desired.

As shown in FIG. 1a, the contacts 0–9 of each register 10a–10 have their contacts electrically coupled together, that is, the 0 contact of register 10a is coupled to the 0 contact of registers 10b, 10c and 10d. Thus, there is provided outputs over common data lines shown at 0–9, respectively.

The scanning inputs to the wiper arms 11a–11d are shown at G2–G5, respectively. The presence of a scanning signal at G2 will provide a signal through wiper arm 11a and thence through one of the contacts, for example, the 0 contact, and thereby provide an output signal on the 0 common data line.

Now referring to FIG. 1b, there is illustrated a plurality of indicators 12a–12d. These indicators are preferably of the type sold by Tungsol Electric Inc., of Newark, N. J., generally called "Optimum Contrast Illuminated Digital Display," Catalog No. A41-0-12. These units provide an illuminated segmented display of symbols, such as numerals or letters, by selectively actuating seven incandescent bulbs or the like in a predetermined manner. For the purpose of illustration, the block 12a is shown having incandescent lighting means, individually coupled to input terminals shown at G5a–G5g, respectively. Each register 12a–12d could be utilized to display information form each of the four registers, 10a–10d, respectively. Schematically, the indicators 12a–12d have their illuminating means coupled together at one common connection 13 and thence through an on-off switch 14 to a source of B+ voltage, such as a battery 15. It should be understood that the other indicators are coupled to the battery 15 in the same manner.

In essence, the display indicators 12a–12d operate to provide illuminated symbols in accordance with a seven digit code provided to them over seven data lines which are coupled to the input lines shown at G5a–G5g, G4a–G4g, G3a–G3g and G2a–G2g. In order to provide the number 1, the lines indicated at G5a and G5b would be energized. To provide the number 2, lines G5a, G5c and G5d as well as G5f and G5g, would be energized. To provide the number 3, lines G5c–G5g would be energized. To provide number 4, lines G5b–G5g would be energized. To provide number 5, lines G5b and G5c would be energized as well as lines G5e–G5g. To provide the numeral 6, lines G5a–G5c and lines G5e and G5g would be energized. To provide number 7, lines G5c –G5e would be energized. To provide number 8, lines G5a–G5g would be energized. To provide the numeral 9, lines G5b–G5g would be energized and to provide the numeral 0, lines G5a–G5f would be energized.

In order to provide the seven digit code required to operate the indicators 12a–12d, respectively, from the ten digit code provided from registers 10a–10d, respectively, there is provided a coding means at 20, in FIG. 1c. In the preferred embodiment, the coding means is a decimal to seven segment converter. Terminals 0–9 in this figure are coupled to the terminals 0–9 emanating from the registers 10a–10d, respectively. As illustrated, the coding means comprises NOR gates 21–24 and inverters 25–28. Two input NOR gates are also provided at 29 and an inverter coupled thereto at 30. Thereafter, the output signals from the inverters 25–28 and 30 are coupled to the three input NOR gates at 31, a five input NOR gate at 32, a four input NOR gate at 33, a four input NOR gate shown at 34, a four input NOR gate shown at 35, a four input NOR gate at 36, and a four input NOR gate shown at 37.

The logic of the circuit is such that a signal will be present at the output of the NOR gate 31 if a 1, 4, 5, 6, 8, 9 or 0 has been detected from the registers. To simplify the understanding of the logic of the circuitry, there is shown the logical outputs 40, 41, 42 and 43, indicating the outputs from the first group of inverters 25–28, respectively. Additionally, there is shown the output in block form at 44 which indicates the output at the NOR gate 29. Also in block form there is shown at 45 the output of inverter 30. Thereafter, the logical outputs which indicate the presence of a signal corresponding to the presence of a signal at the input 0–9 are logically indicated by blocks shown at 50–56, respectively. Thus, there is indicated the logical presentation of the function of the NOR gates and inverters of the coding circuit. In the embodiments of this invention the NOR circuit provides a ground potential output when there are input signals present and a positive output signal in the absence of signals on the input lines to it. The NOR gates may be of the type shown in the textbook "Digital Computer Fundamentals," Thomas C. Bartee, 2d Ed., pub. by McGraw-Hill Book Co., 1966. Thus, there is provided over seven data lines shown at 60–66, the seven digits required to operate the indicators 12a–12d, respectively.

To control the scanning of the registers 10a–10d, as well as the gating signals obtained from these registers, a control system 70 (see FIG. 1d) is provided. The control system 70 comprises a clock 71, which could be in the form of a pulse generator or the like, providing current pulses at a predetermined frequency. In order to provide the signals to scan each of the four registers 10a–10d, as well as to gate the signals obtained from the registers provided from the coding means 20, there is provided a logical network comprising two bistable flip-flops 72 and 73, inverters 74 and four NOR gates shown at 75–78. The flip-flops, the inverts and the NOR gates are coupled together, such that four independent time-spaced signals are provided at the output of lines 81–84, respectively. The flip-flop 72 operates to divide the frequency of the pulse signal 71 and to provide two complementary square wave signals therefrom. One of the two output signals is directed into NOR gates 75 and 76 and the other output signal is directed into the inverter 74 and also to NOR gates 77 and 78. The output signal of inverter 74 drives the flip-flop or multivibrator shown at 73 and provides an output signal which is used to control the NOR gates 75–78. The multivibrator 73 will divide the output frequency of the signal provided to it through the inverter 74. In this manner, four time-spaced signals are provided to sequentially scan the registers 10a–10d as well as feeding the signals provided over data lines 60–66. These signals are obtained from the NOR gates 75–78 over output lines 81–84, respectively. As shown, output line 81 is connected to an inverter 91a which, in turn, provides a signal at the G2 connector to the G2 connection shown in FIG. 1a which is coupled to the wiper arm 11a of the register 10a. Additionally, the line 81 is coupled through an inverter 91b and thence through a power driver 91c to provide at line 100a an output signal for driving a gating means generally shown at 102. Likewise, the NOR gate 75 is coupled to inverter 91b which provides a signal at the connector output G4 to the connector G4 shown in FIG. 1a, which is coupled to the wiper arm 11c of register 10c. The NOR gate 76 is coupled to an inverter 92b and a power driver circuit 92c for providing gating signals over line 100b to the gating means 102. At the same time, gate 77 is coupled to an inverter 93a to provide a scanning signal to the register 10d. Likewise, gating signals are provided over lines shown at 100c through an inverter shown at 93b and a power driver circuit shown at 93c. Additionally, scanning signals are provided to the register 10b through an inverter shown at 94a and gating signals are provided from NOR gate 78 through an inverter 93b and a power driving inverter 94b and 94c over line 100b.

The gating circuit means 102 (see FIG. 1e) comprises NOR gates shown at 120a–120g which are coupled to transistors shown at 121a–121g, respectively. The output from the transistors 121a–121g provides signals at connectors G2a–G2g to drive the indicator display device 12d. The NOR gates 120a–120g are coupled to lines 60–66, respectively, and are driven by gating signals from line 100a. The second tier of gating means comprises NOR gates 122a–122g which are coupled to transistors 123a–123g, respectively. These transistors in turn drive inputs G3a–G3g of the display unit shown at 12c. The NOR gates 122a–122g are driven from the data lines 60–66, respectively, and by gating signals provided over the gating line 100b. In order to operate the display 12b, there are provided NOR gates 124a–124g which are in turn coupled to driving transistors 125a–125g, respectively. Data signals are provided over lines 60–66 to the NOR gates 124a–124g and these NOR gates are controlled by gating signals from lines 100c.

Additionally, to drive the illuminating means of the indicator 12a, there are provided NOR gates 126a–126g which in turn are coupled to driving transistors 127a–127g, respectively. These NOR gates are connected to the data lines 60–66, respectively, and are controlled by gating signals over lines 100d.

In this manner the registers 10a–10d are scanned by signals from the control means 70 and in turn the signals obtained through the registers 10a–10d are sequentially gated in a predetermined order through the gating means 102. Preferably the illuminating means of the indicators are energized often enough so that, to the human eye, it appears that the display is stationary.

Referring now to FIG. 2, there is illustrated a silicon-controlled rectifier 130 which may be driven from the NOR gates, such as gate 126g. The rectifier 130 may be used in place of the transistors shown in the gating means 102.

In FIG. 3 there is shown the face of the display indicators 12a to 12d. The segments marked A–G are illuminated in response to the turning on of the lights A–G of each of the indicators 12a–12d as a result of signals provided from the gating means 102.

It will thus be seen that the objects set forth above, among those made apparent from the preceding description, are efficiently attained and since certain changes may be made in the foregoing constructions without departing from the spirit and scope of the invention, it is intended that all matter contained in the above description or shown in the accompanying drawings shall be interpreted as illustrative, and not in a limiting sense.

It is also to be understood that the following claims are intended to cover all the generic and specific features of the invention herein described and all statements of the scope of the invention which, as a matter of language, might be said to fall therebetween.

1. In a system for reading out information stored in a plurality of metering registers where each register includes a plurality of electrical contacts which are adapted to be energized in accordance with information stored in the register and where one of the contacts is energized upon application of an electrical potential to the register, the improvement comprising a plurality of display devices, each of said display devices having a plurality of segments adapted to be selectively energized and illuminated to represent the data in an associated one of said metering registers, means providing a plurality of sequentially occurring scanning signals, means for sequentially scanning the plurality of metering registers by applying said sequential signals thereto and deriving a signal indicative of the data stored therein, coding means for operating on said derived signals in accordance with the scanning sequence to sequentially provide encoded signals indicative of the data in each register and decoding means responsive to the coded signals and the scanning signals for applying energizing signals to segments of said display devices in the same sequence in which said registers are scanned.

2. The system of claim 1 wherein said means for sequentially applying signals is repetitively operative to scan said registers in the sequence.

3. A system according to claim 1, in which the means for applying a potential comprises a clock, a first bistable multivibrator having first and second output terminals and an input terminal coupled to said clock, an inverting amplifier coupled to the second output terminal of said first bistable multivibrator, a second bistable multivibrator having first and second output terminals and an input terminal coupled to said inverting amplifier, and a plurality of gates arranged to sense the output signals of said multivibrators and provide a plurality of sequentially occurring signals.

4. A system according to claim 3 further including means for coupling the sequentially occurring signals from said gates to said registers.

5. A system according to claim 1, wherein said coding means converts information from ten data lines into information suitable for transmission over seven data lines, said seven data lines providing signals to said decoding means for each register to operate each of said plurality of display devices.